United States Patent
Patton

(10) Patent No.: US 11,157,042 B1
(45) Date of Patent: Oct. 26, 2021

(54) SYSTEMS AND METHODS FOR INTERACTION OF WEARABLE COMMUNICATION DEVICES

(71) Applicant: Douglas Patton, Irvine, CA (US)

(72) Inventor: Douglas Patton, Irvine, CA (US)

(73) Assignee: Douglas Patton, Newport Beach, CA (US)

( * ) Notice: Subject to any disclaimer, the term of this patent is extended or adjusted under 35 U.S.C. 154(b) by 0 days.

(21) Appl. No.: 16/368,680

(22) Filed: Mar. 28, 2019

Related U.S. Application Data

(60) Provisional application No. 62/649,331, filed on Mar. 28, 2018, provisional application No. 62/815,661, filed on Mar. 8, 2019.

(51) Int. Cl.
| | |
|---|---|
| *G06F 3/01* | (2006.01) |
| *G06F 1/16* | (2006.01) |
| *G08B 5/36* | (2006.01) |
| *G08B 6/00* | (2006.01) |

(52) U.S. Cl.
CPC ............. *G06F 1/163* (2013.01); *G06F 3/011* (2013.01); *G06F 3/016* (2013.01); *G08B 5/36* (2013.01); *G08B 6/00* (2013.01)

(58) Field of Classification Search
CPC .......... G06F 1/163; G06F 3/011; G06F 3/016; G08B 5/36; G08B 6/00
See application file for complete search history.

(56) References Cited

U.S. PATENT DOCUMENTS

| | | | |
|---|---|---|---|
| 9,473,878 B2 | 10/2016 | Sydir et al. | |
| 9,836,083 B2 | 12/2017 | Ricci | |
| 9,936,273 B2 | 4/2018 | Biggs | |
| 9,939,910 B2* | 4/2018 | Shah | ....................... G06F 3/017 |
| 10,043,380 B2 | 8/2018 | Kahl | |
| 10,191,537 B2 | 1/2019 | Tanaka et al. | |
| 10,216,280 B2 | 2/2019 | Levesque et al. | |
| 10,219,340 B2 | 2/2019 | Gerszberg | |
| 10,222,617 B2 | 3/2019 | Jannard | |
| 10,234,956 B2 | 3/2019 | Shah et al. | |
| 2013/0288761 A1* | 10/2013 | Santos Paiva Ferraz Conceicao | ............ A63F 13/218 463/7 |
| 2015/0062959 A1* | 3/2015 | Wilson | .................. F21V 33/008 362/570 |
| 2015/0149924 A1* | 5/2015 | Tsai | ......................... G06F 1/163 715/748 |
| 2017/0103440 A1* | 4/2017 | Xing | ....................... H04W 4/90 |
| 2017/0135612 A1* | 5/2017 | Singhatat | .............. A61B 5/1117 |
| 2018/0000205 A1 | 1/2018 | Chinowsky et al. | |
| 2018/0052428 A1* | 2/2018 | Abramov | ............... G04G 21/04 |
| 2018/0120930 A1 | 5/2018 | Turner | |

(Continued)

FOREIGN PATENT DOCUMENTS

| | | | |
|---|---|---|---|
| CN | 204557378 U | * | 8/2015 |
| CN | 206441121 U | * | 8/2017 |

(Continued)

*Primary Examiner* — Yong Hang Jiang
(74) *Attorney, Agent, or Firm* — Ryan Dean; Umberg Zipser LLP

(57) ABSTRACT

Systems and methods are described for coordinating actuation of a plurality of wearable devices of one or more wearers. The wearable devices can comprise many forms including clothing and jewelry and allow a wearer to further interact with an environment.

6 Claims, 12 Drawing Sheets

(56) References Cited

U.S. PATENT DOCUMENTS

| | | | |
|---|---|---|---|
| 2018/0232055 A1 | 8/2018 | Shah et al. | |
| 2018/0241864 A1 | 8/2018 | Males et al. | |
| 2018/0376561 A1* | 12/2018 | Pham | H05B 45/20 |
| 2019/0132948 A1* | 5/2019 | Longinotti-Buitoni | A61B 5/0022 |
| 2019/0339853 A1* | 11/2019 | Rakshit | G06F 3/014 |

FOREIGN PATENT DOCUMENTS

| | | | | |
|---|---|---|---|---|
| CN | 107333225 B | * | 12/2018 | |
| WO | WO-2018014357 A1 | * | 1/2018 | H04W 4/06 |

* cited by examiner

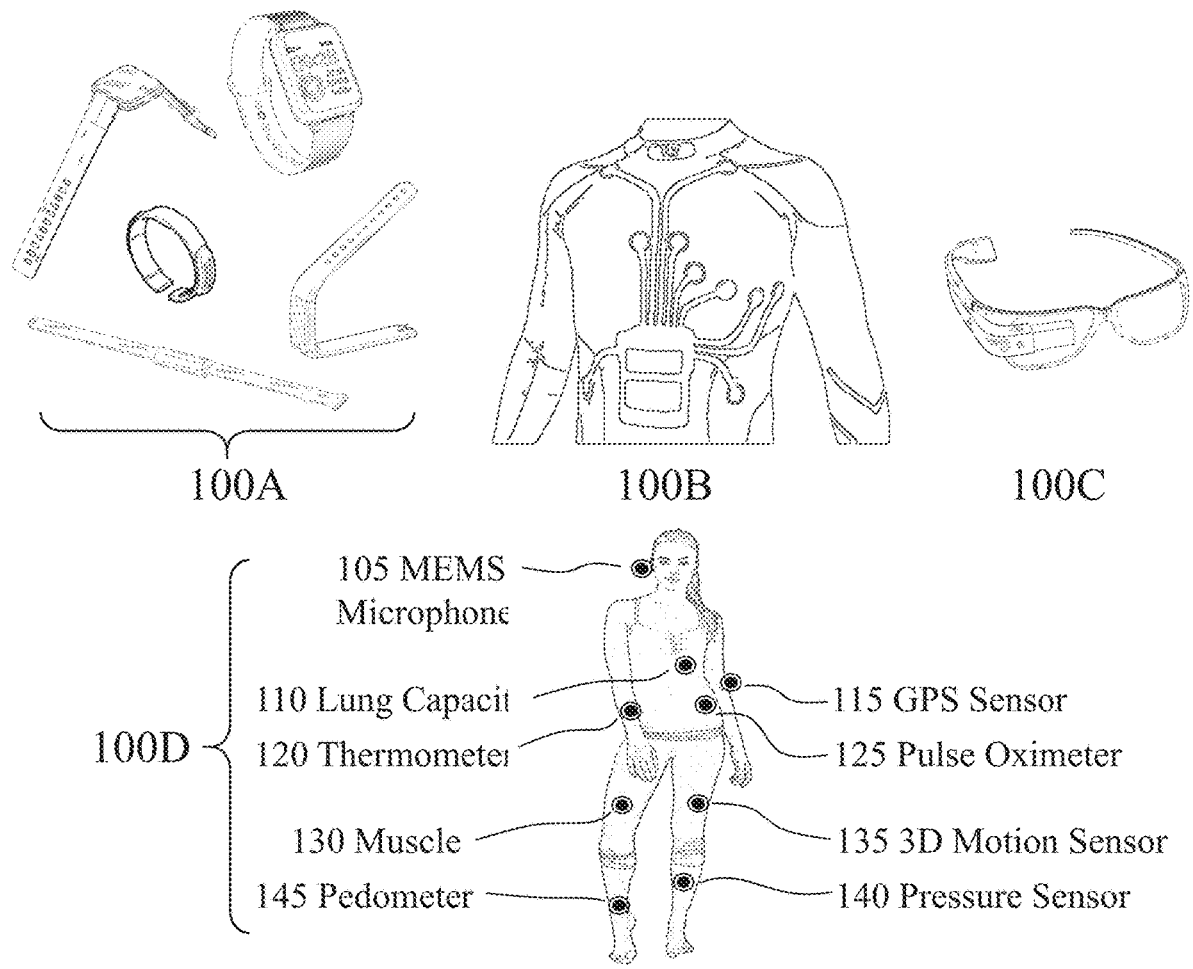
Figure 1A
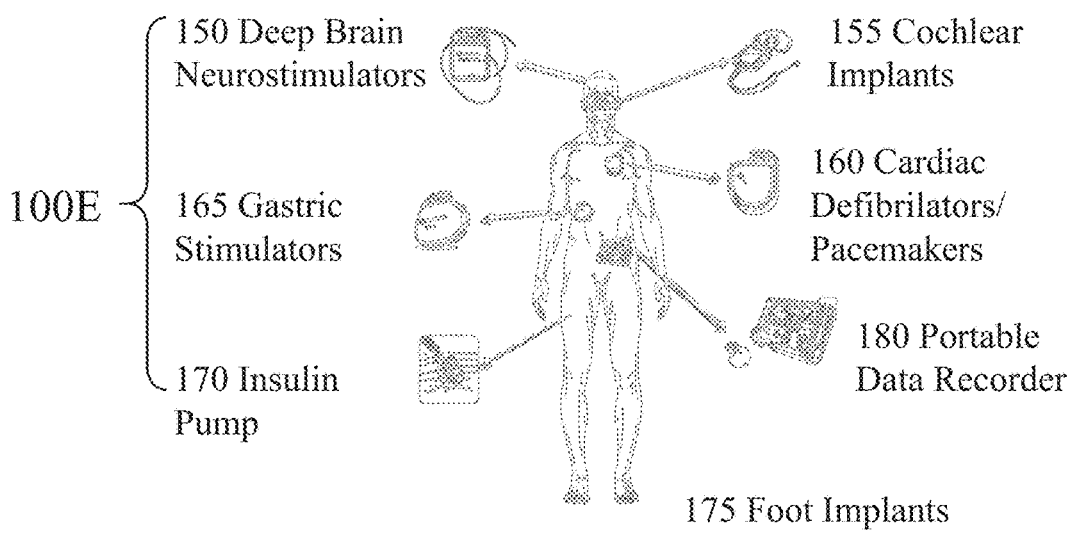

SYSTEMS AND METHODS FOR INTERACTION OF WEARABLE COMMUNICATION DEVICES

This application claims priority to U.S. provisional applications having Ser. No. 62/649,331 filed on Mar. 28, 2018 and provisional application having Ser. No. 62/815,661 filed on Mar. 8, 2019. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is wearable communication devices.

BACKGROUND

The following description includes information that may be useful in understanding the present invention. It is not an admission that any of the information provided herein is prior art or relevant to the presently claimed invention, or that any publication specifically or implicitly referenced is prior art.

In today's environment, smart phones and other devices can often limit interfaction of people with others.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for software and technology that can diversify and increase interactivity among people.

SUMMARY OF THE INVENTION

The inventive subject matter provides apparatus, systems and methods in which a plurality of wearable devices can be networked to permit communication and interaction of user and their wearable devices. This advantageously can create a greater level of interaction in a digital age.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1B:
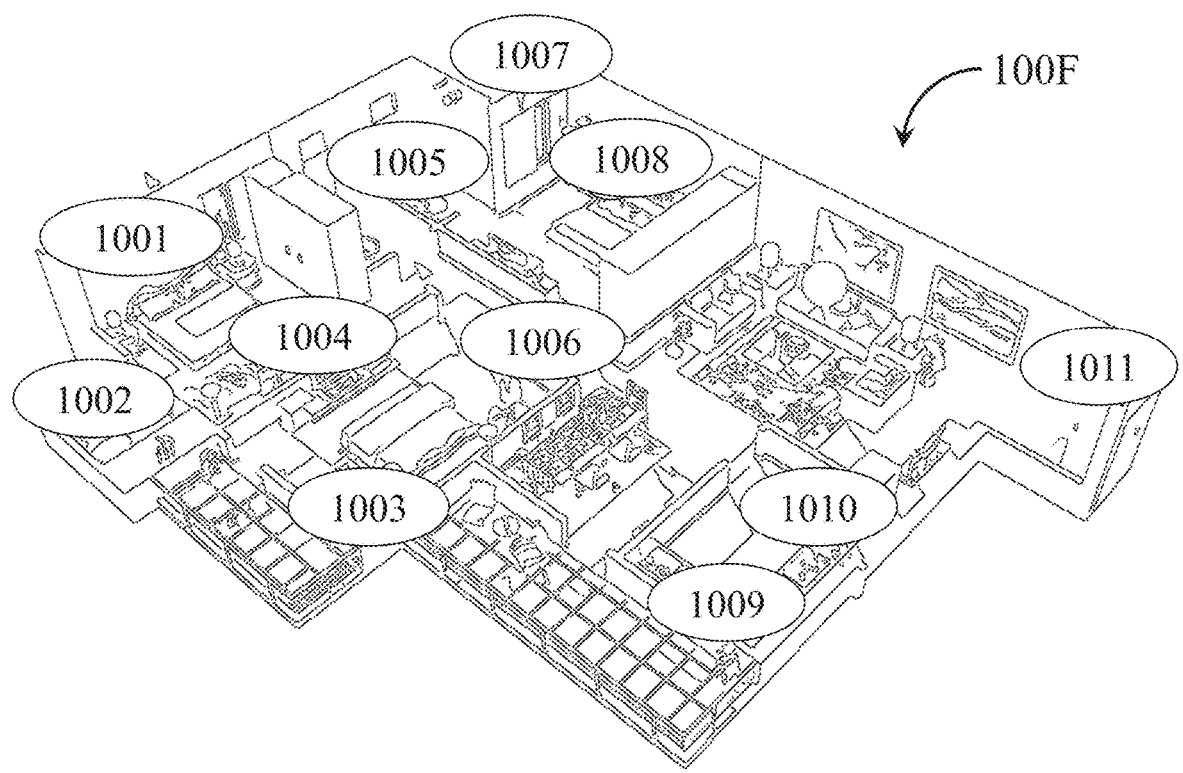
FIG. 1 illustrates one embodiment of a wearable device.
Figure 1B:
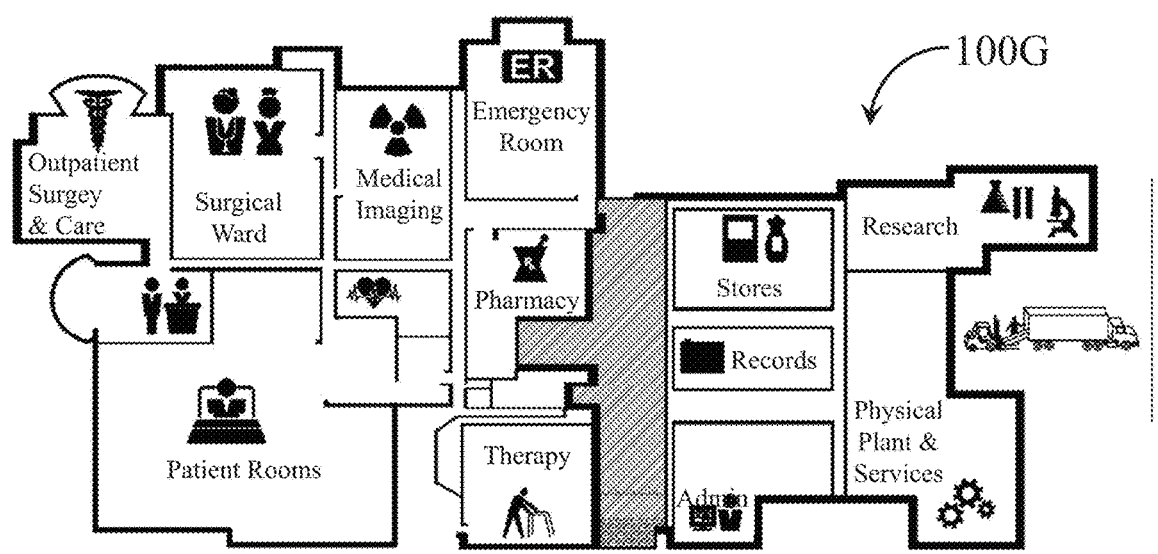

FIG. 1 illustrates one embodiment of a wearable communication device 100. Such devices can comprise various items including, for example, (i) rings, earrings, bracelets, necklaces and other jewelry, (ii) watches, hats, eyeglasses, sunglasses, belts, or other accessories, and (iii) socks, shirts, and other items of clothing.

Device 100 preferably comprises a microcontroller 104, memory 102 and transceiver 106, and is configured to send and receive signals or commands, as well as store one or more programs for operation in memory 102. Device 100 can also include one or more power sources 108 such as a battery. Although it is contemplated that the battery could be charged via induction or other wireless charging, wired charging, or replaceable batteries are also contemplated.

In some embodiments, the transceiver can be configured to communicate with other devices via Bluetooth™ or other low-power communication protocols.

Device 100 further comprises one or more solenoids 110, which can be controlled using the microcontroller to cause a tactile response to an input. In this manner, the solenoid(s) 110 can be caused to actuate which creates a physical sensation for the user wearing device 100.

Optionally, device 100 may include a speaker and/or microphone. For example, the microphone 120 could be used to permit voice actuation of the device 100 (e.g., turn on or off, or take other action). Microphone 120 could also be used to sample the surrounding environment such as permitting sampling of music being played outside, etc.

Device 100 may also include a vibrator to provide further tactile effects for a wearer of the device 100.

Contemplated devices may have a sleek and modern look such that they accessorize a wearer's appearance. Preferred devices are also comfortable to wear and simple to use.

Figure 2:
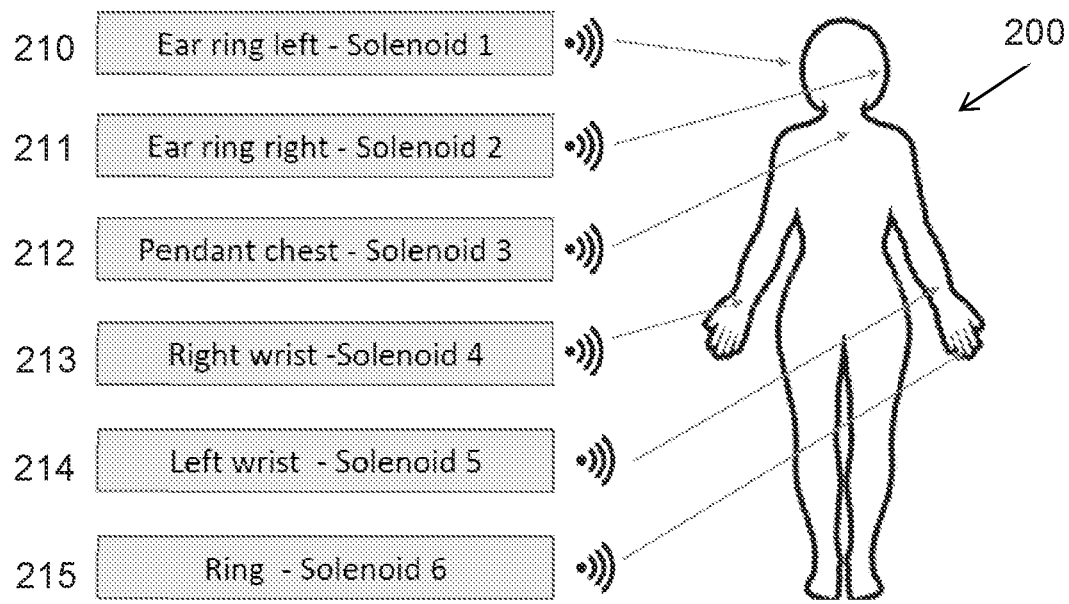
FIGS. 2-6 illustrates various embodiments of systems for coordinating interaction of wearable devices.
Figure 2:

FIG. 2 illustrates how a plurality of wireless communication devices (e.g., devices 210-215) such as that described in FIG. 1 can be worn at different points on a wearer's body 200. In such embodiments, it is contemplated that each of the devices 210-215 can be linked such that their usage can be coordinated with others of the devices 210-215.

In some embodiments, a portable computing device 220 such as a laptop, tablet PC, smart phone, or smart watch can wirelessly interrogate each of the devices 210-215 to determine what type of devices are present on the wearer 200 and where they are located relative to one another. Such interrogation can occur automatically such as via a software application on the portable computing device 220, or it is contemplated that the wearer could manually indicate a location of each device 210-215 such as by selecting an approximate location on the computing device 220.

It is contemplated that each device 210-215 can have a unique identifier. Once each of the devices 210-215 have been identified and located, it is contemplated that the portable computing device 220 can send a signal to each of the devices 210-215 that provides an algorithm to each device for its proper function relative to the other devices. Although it is contemplated that a wearer may have between one to six devices worn at a time, there is no specific limit to the number of devices worn at a time.

Figure 3:
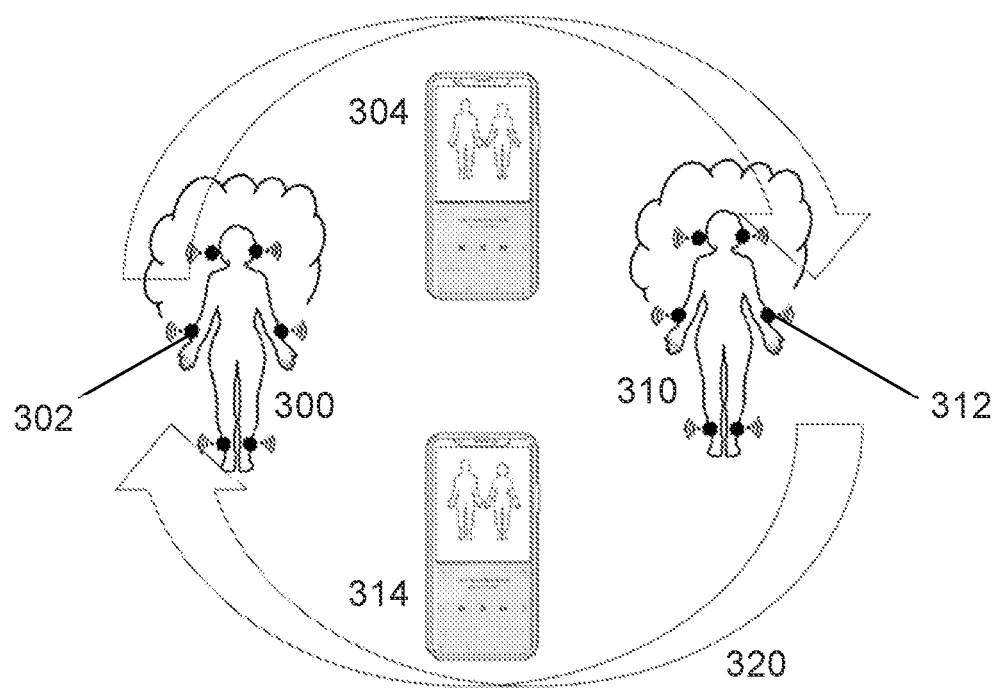

FIG. 3 illustrates one example of how wireless wearable devices could be used to communicate with other devices, both those worn on the same wearer, and those on other wearers. As shown, wearer 300 has a plurality of wearable devices 302 on wearer 300 (shown as black dots). Each of the wearable devices 302 can be configured to wirelessly communicate with other wearable devices 302 as well as portable computing device 304.

Similarly, wearer 310 has a plurality of wearable devices 312 on wearer 310 (shown as black dots). Each of the wearable devices 312 can be configured to wirelessly communicate with other wearable devices 312 as well as portable computing device 314.

It is also contemplated that one or more of wearable devices 302 can be configured to communicate with portable computing device 314 or one or more of wearable devices 312. Similarly, it is contemplated that one or more of wearable devices 312 can be configured to communicate with portable computing device 304 or one or more of wearable devices 302. Such communication preferably occurs using network 320. Although a local network such as a Bluetooth connection between or among the devices 302, 304, 312 and 314, it is contemplated that one or more of the devices 302, 304, 312 and 314 could communicate with others using an internet connection, such as using Wi-Fi.

Figure 4:
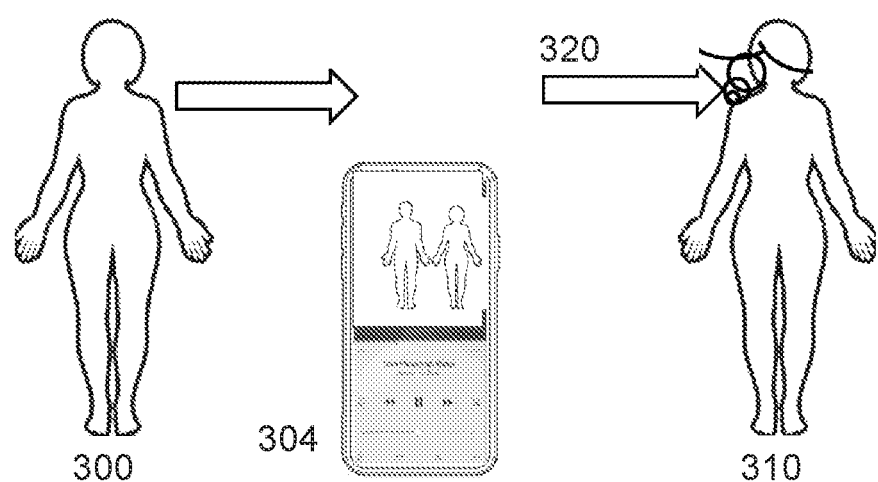

As shown in FIG. 4, wearer 300 could use portable computing device 304 to send a message to wearer 310 via network 320. Unlike text messaging or other social media messaging, such messages could be non-verbal. It is contemplated that the specific message sent could be configured by the sender and/or receiver. For example, a receiver (here, wearer 310) may configure the wearable devices 312 to react a specific way if a message is received from wearer 300 but react differently if a message is received from someone else. The variation could include, for example, which device(s) 312 to actuate and in what order, what pattern of actuation for a specific device, and whether the actuation occurs multiple times.

As an example, wearer 300 could send a message to wearer 310 by using computing device 304. The message may simply include the time and sender information, or could be more complex, such as vibrate left ear of wearer 310 two times, and then vibrate the right ear of wearer 320 once. As detailed above, the specific vibration can also include a single vibration or may include a pattern of vibrations, such as long, short, short, etc. Much like Morse code, the message can be tailored to a specific sender or recipient, and/or a specific message to be communicated.

It is contemplated that an answer to a question could be as simple as vibrating one side of a wearer for "yes" and the other side of the wearer for "no".

Figure 5:
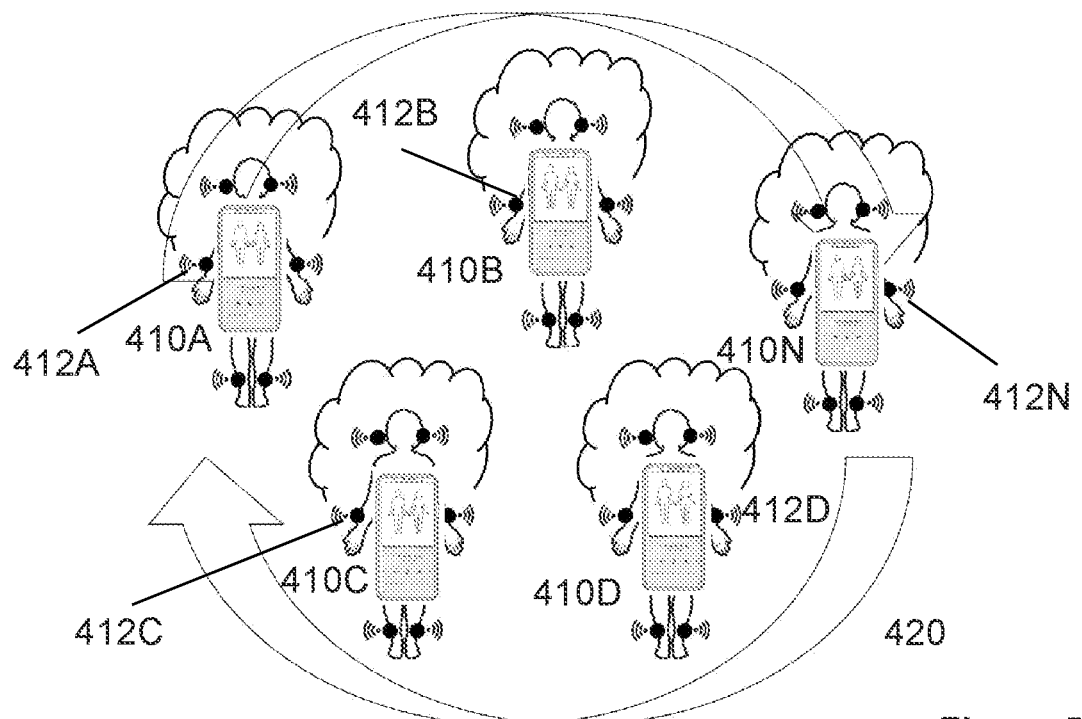

FIG. 5 illustrates how a mesh network or other internetwork 420 can be created among wearable devices 412A-412N of a plurality of wearers 410A-410N, respectively. As shown in FIG. 5, each of the wearers 410A-410N can have a portable computing device that is configured to communicate with the devices of that wearer. In such embodiment, it is contemplated that messages and signals can be sent from phone to phone (portable computing device to portable computing device) such as via network 420, and the respective portable computing devices can then send signals to the wearable devices of that wearer.

Using such a network on wearable devices 412A-412N, it is contemplated that the group of wearers can have shared experiences, such as immersion in music, painting, and others. As an example, the users could utilize their wearable devices 412A-412N to virtually paint and/or create. One or more of the wearers could open an application on their respective computing devices, which in turn will look for other wearers having the same application open. Such wearers may be within a certain geographic distance from each other, or could be located in disparate locations.

The wearers' computing devices can periodically ping for other devices to communicate and link with to build a network of devices. Within the network, the devices can communicate with one another. Using the example of painting, the communication may determine what colors, drawing utensils, etc. to be used by each of the wearers 410A-410N, and which wearers will participate and which may be observers. Once the painting is set up, the wearers 410A-410N can virtually paint, sculpt or otherwise using their body's movement. Thus, by a flick of the wrist, a movement of an arm, a kick of a leg, and so forth, a wearer can virtually paint.

The movements of the wearers 410A-410N of a group can be overlaid onto a single "artwork" such that each of the participating wearers can contribute to an artwork. Because the wearers can track movement in three-dimensions, the creation can be three-dimensional. Using the portable computing device, each wearer can view the creation. In other embodiments, it is contemplated that the creation and/or the specific movements creating it can be streamed to a remote source and displayed on a central device or stored/streamed on a remote device (e.g., file streaming server) for viewing by others.

Figure 7:
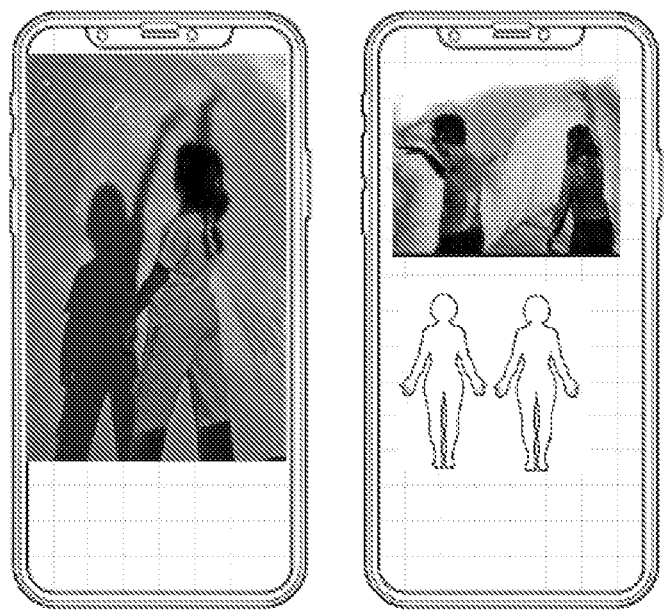
FIGS. 7-8 illustrate embodiments showing body painting using wearable devices.
Figure 8:

FIGS. 7-8 illustrates embodiments of what a three-dimensional artwork may look like on a portable computing device. As can be seen, the possibilities are limited only to the creative minds of the wearers.

Figure 6:
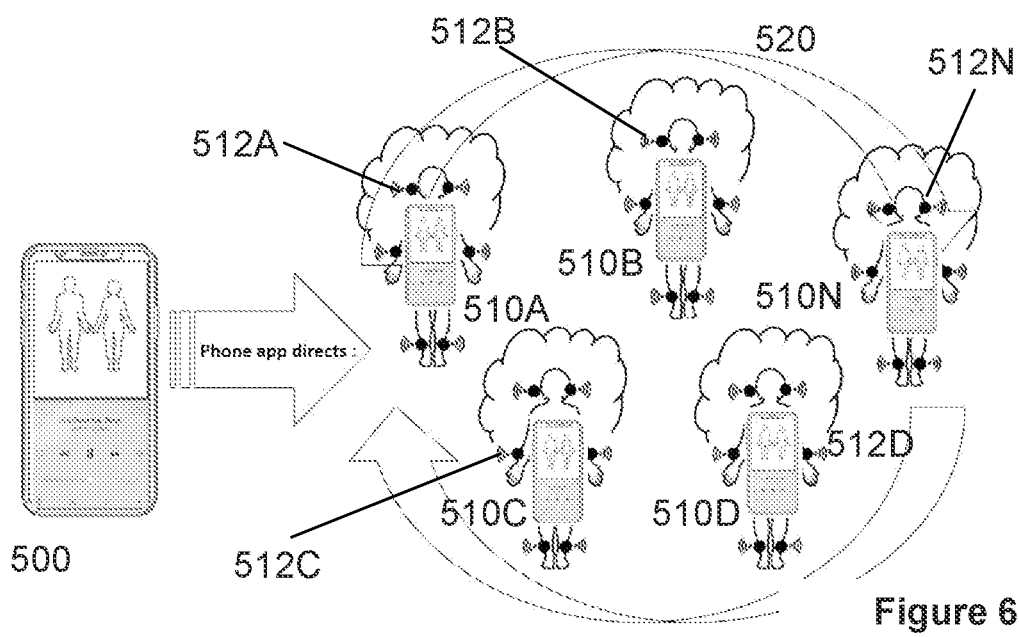

FIG. 6 illustrates another example showing interaction among a group of wearable devices 512A-512N of a plurality of wearers 510A-510N, respectively. Each of the wearers 510A-510N can have a portable computing device that is configured to communicate with the devices of that wearer. Unlike the example of FIG. 5, in FIG. 6 a central controller 500 could be used to coordinate the various devices 512A-512N of the wearers 510A-510N of a group. Using the central controller, messages could be sent to each of the wearers 510A-510N of a group.

Taking the painting example described above, in the embodiment shown in FIG. 6, the central controller 500 can coordinate initialization of the painting project by communicating with each of the devices of the wearers 510A-510N, and the devices of the wearers 510A-510N in turn communicates with the respective wearable devices 512A-512N associated with each wearer.

Thus, in such examples, the wearable devices can be used to paint on a portable computing device or other device having a display such as a television. The painting is accomplished by movement of the wearables (such as by moving the wearer's body), and can be combined with two or more people in the same or different locations. Dancing and movements can be recorded with an overlay of different brushes and colors and/or surfaces, which can be used to create two-dimensional, and preferably three-dimensional, forms.

In such embodiments, it is preferred that each of the wearable devices comprises a gyroscope and accelerometer, which can be programmed to the type of device and specific location on the wearer. A software application that could reside on one or more portable computing devices can track each accelerator in XYZ coordinates and then determine where the paint should be applied using three-dimensional coordinates. By monitoring where each wearer (and their wearable devices) are relative to others in the group, the three-dimensional artwork can be created based on the overlay of each wearer's efforts. It is contemplated that a wearer could virtually walk around a creation and add to it using body movements.

In other contemplated embodiments, it is contemplated that the wearables themselves could communicate with other wearables without the need for a portable computing device to shepherd their interaction. In such embodiments, the wearables can have a smart AI programming that periodically monitors for other connections to communicate and link with to build a network of wearables in a specific area and/or for a specific task such as body painting described above.

In such embodiments, the interaction can occur with a server or other central controller. Small, local networks such as a mesh network can instead be created dynamically while wearable devices are within a certain range of one another. For example, using a Bluetooth connection, wearers may be required to be within a 20-30 feet range of one another.

To guide interaction with devices of other wearers, it is contemplated that each wearer could create preferences for interaction with other wearers. Continuing the body paint concept, wearer 1 may input a preference for only three-dimensional creations, rather than two-dimensions. Wearer 2 may input a preference of interacting only with other wearers who want to combine their designs as one three-dimensional overlay. Wearer 3 may input a preference of only observing rather than participating in a creation, but want to add audio effects to the creation as it is drawn. Wearer 4 may input a preference of only want to paint with the color red and in three-dimensions.

The devices or one or more portable computing devices can then search for wearers who meet the criteria set by the wearer. This continues until a group is formed having two or more wearers, where each wearer meets the requirements of the other wearers of the group.

Figure 9:
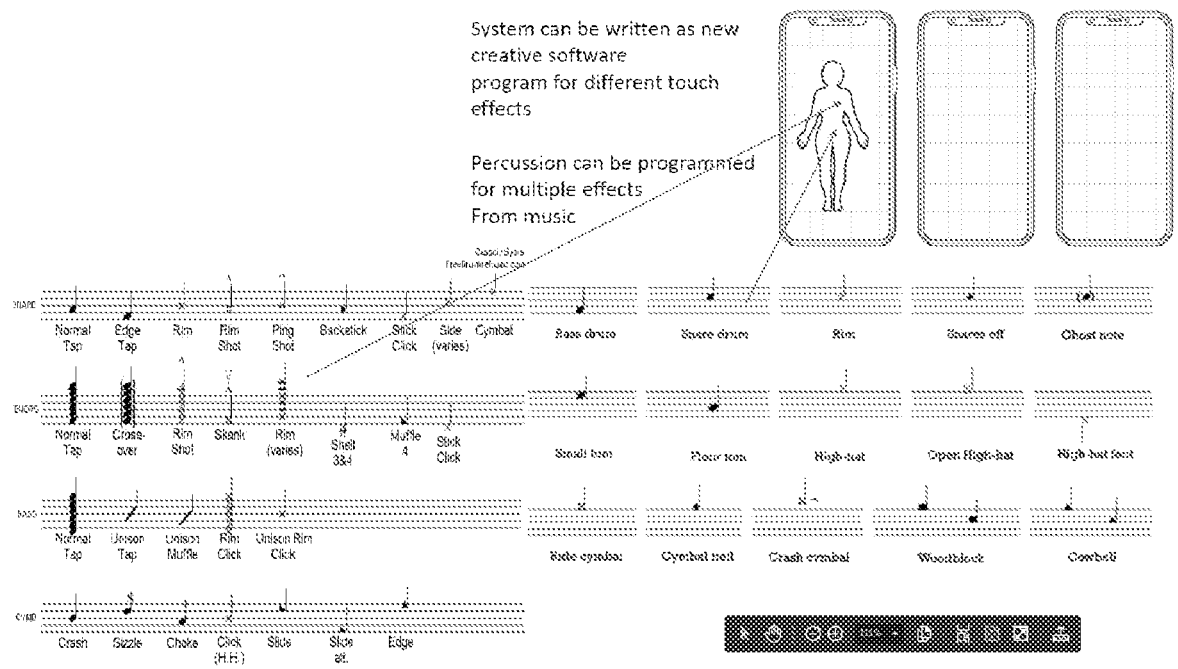
FIG. 9 illustrates one embodiment of a system for actuation of wearable devices based on music.

FIG. 9 illustrates another use of the wearable devices. It is contemplated that the wearable devices such as those described above and below could be used to enhance a wearer's interaction with music. For example, the wearable devices or a portable computing device that controls the wearable devices can be programmed to actuate based on certain notes and/or instruments. As shown in the Figure, use of a snare drum may cause a specific wearable on a wearer to actuate/vibrate. Such actuation/vibration could vary depending on the note played by that instrument or the intensity of a note (in dB).

By actuating at specific locations and times, all of which is coordinated with music being listened to by the wearer, the wearer's experience with the music is enhanced. It is contemplated that the music may be played on the user's portable computing device, which can in turn send signals to the individual wearable devices, or may be based on music played in the surrounding environment, such as a loudspeaker.

It is contemplated that one or more of the wearable devices could include two or more solenoids and/or a vibration motor for added complexity and to provide more variations in the tactile effect that can be produced by each of the wearable devices.

Where a plurality of wearers are listening to the same music, it is contemplated that the specific coordination of the actuation of the wearable devices of each wearer could be synchronized such that each wearer has the same or similar experience. However, such synchronization could depend on whether one or more wearers have set up personal preferences to vary the wearable devices' actuation.

Thus, at a concert or other event, the wearable devices and/or the portable computing device associated with a set of wearable devices, can look for other wearers having wearable devices to communicate and link with. The group of wearers can then listen or dance to music while their hear the beat of a song and the percussion of the music on their skin.

Figure 10A:
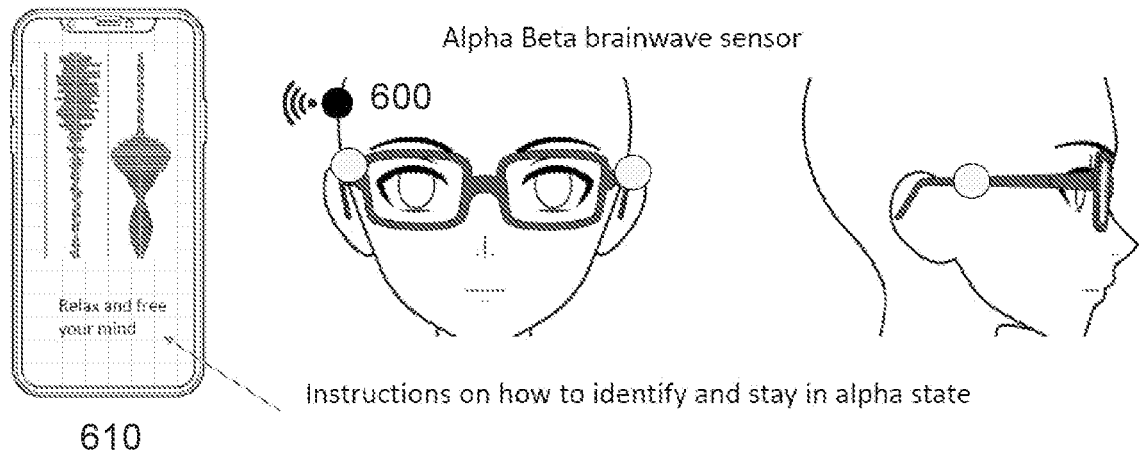
FIGS. 10A-10B illustrate monitoring of health aspects using a wearable devices.
Figure 10B:
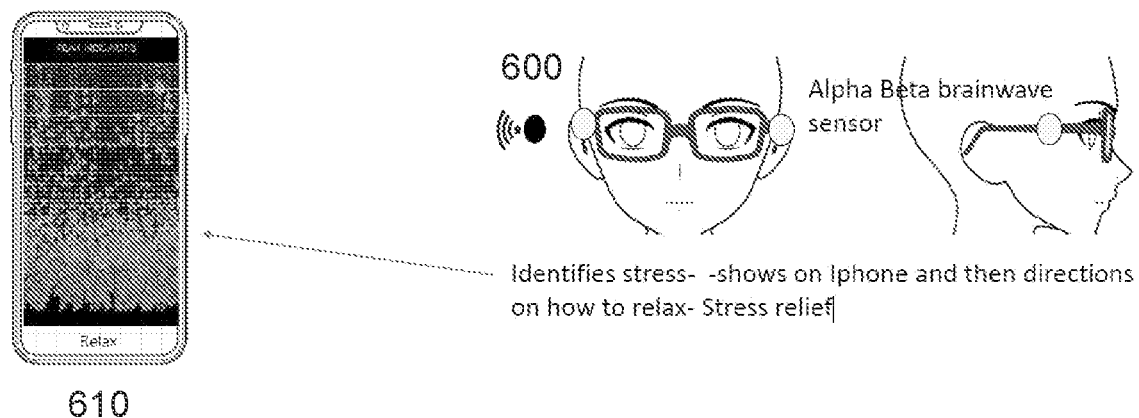

FIGS. 10A-10B illustrate how one or more wearable devices 600 of a user can be used to detect a health aspect of a wearer. As an example, the wearable device 600 could be used to detect brainwaves or a stress level of a wearer, and suggest actions to take based on the sensed data. Such information could be presented on a portable computing device 610 associated with the wearable device 600.

Other health aspects that could be monitored include, for example, calories burned by movement, sleeping, blood pressure, oxygenation, heart rate, irregular heart beats, temperature, heart waveforms, alpha waves, beta waves, and so forth.

Figure 11:
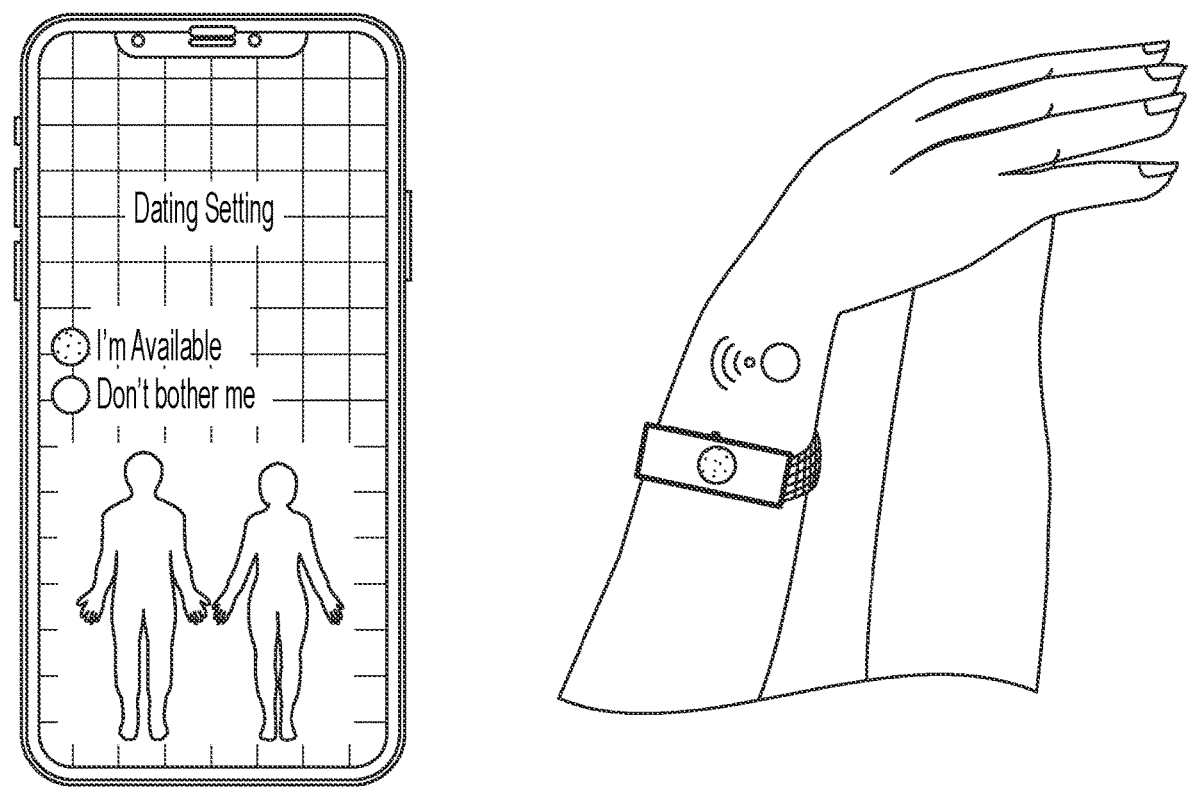
FIG. 11 illustrates one embodiment of a system to guide interaction of users using wearable devices.

FIG. 11 illustrates another use case for the wearable devices. In a dating scenario or a singles hangout, it is contemplated that a wearer could have a wearable device with one or more LEDs or other indicators to show interest in talking to potential suitors (e.g., green to show interest and red to indicate no interest). In another aspect, if a potential match is made such as through a website or other avenue, a wearable device of each of the two wearers of the match could have their wearable device light up in a certain color or provide another indication that is identical such that they can find one another in a group.

Figure 12A:
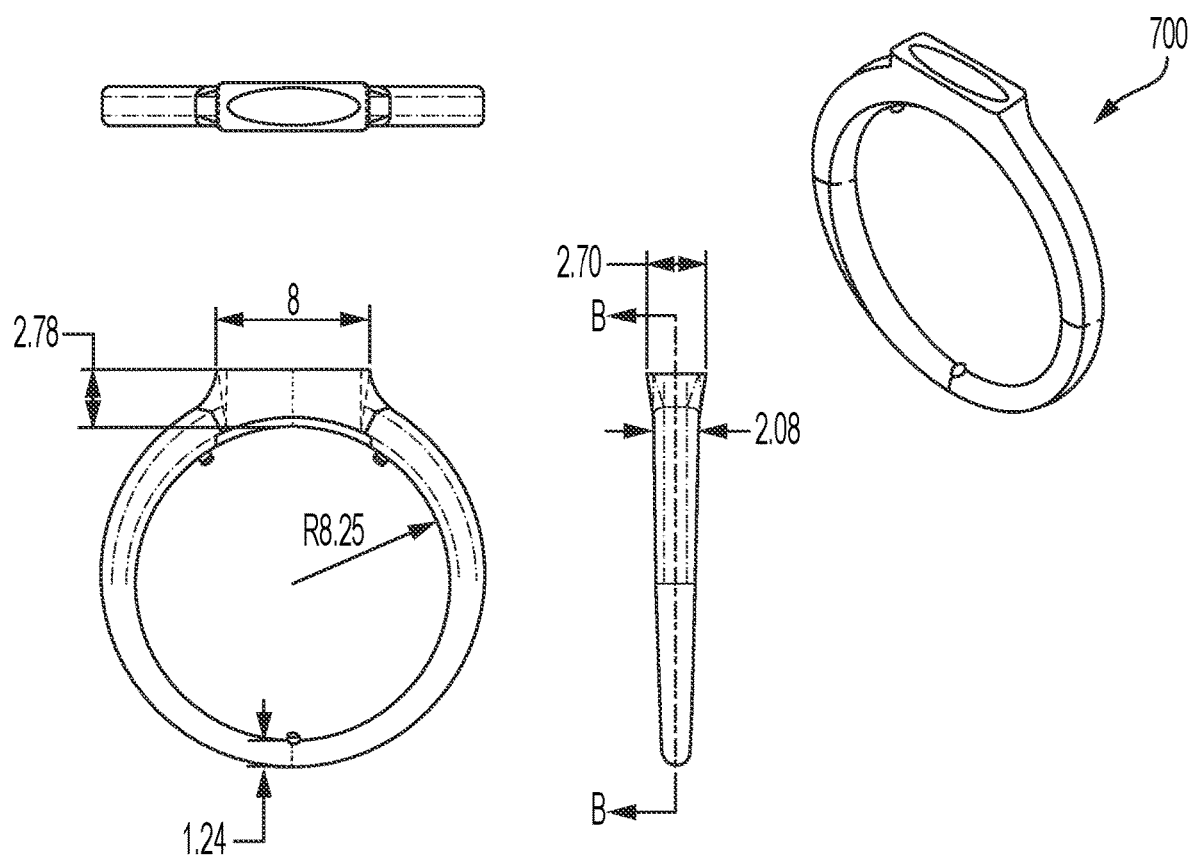
FIGS. 12A-12B illustrate another embodiment of a wearable device.
Figure 12B:
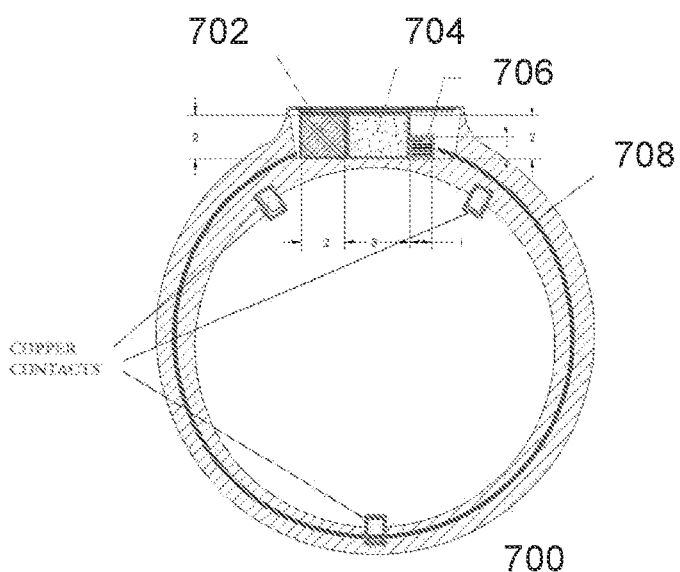

FIGS. 12A-12B illustrates one embodiment of a wearable device 700 in the shape of a ring. The device 700 can comprise a memory 702, a processor 704, an accelerometer 706, and an antenna/transceiver 708 embedded into the device 700 (here, the band of the ring).

The device 700 can be configured to track and/or report hand movements, which could be used from everything from creating art as described above to controlling a television or smart home device. For example, a user could move a finger up or down to change a channel on a radio or television, or change the volume. As another example, a user could control a light source, such as dimming a light source by rotating a hand.

Figure 13A:
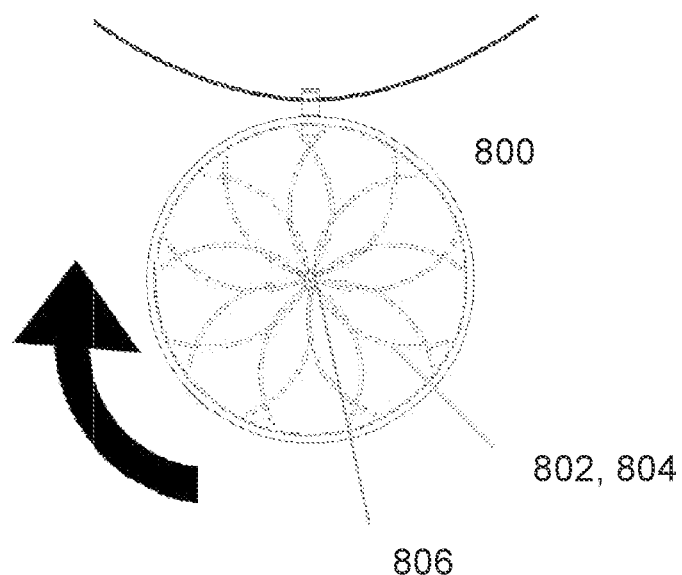
FIGS. 13A-13B illustrate another embodiment of a wearable device.
Figure 13B:
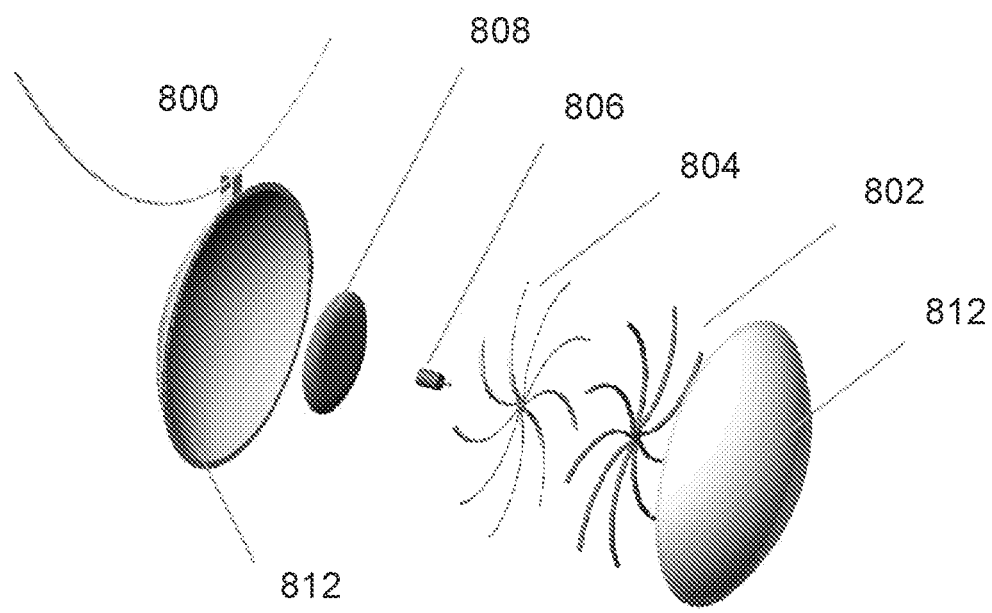

FIGS. 13A-13B illustrates another embodiment of a wearable device 800 in the shape of a pendant. The device can include first and second rotatable pieces 802, 804 that rotate about an axis using a micro motor 806. The device 800 can further include a power source 808 and a transceiver for communication with other devices. Device 800 can further include a housing 812 within which the various components can be held. Some or all of the housing, such as the front-facing portion, can be translucent or transparent to permit viewing of the rotatable pieces 802, 804.

The device 800 could also include one or more light sources for additional effects.

It is contemplated that device 800 could have rotatable pieces 802, 804 spin, turn, etc. with music, as a reaction to an emotion, or based on a user's preference or command. For example, the device 800 could have rotatable pieces 802, 804 spin when in proximity to a specific person (e.g., significant other). The device 800 could also be controlled by a user's or another user's smart phone or other computing device.

Devices such as those described above is therefore "smart" and may detect the presence of other such devices. Thus, for example, upon getting within a certain distance of another wearer with a similar device, the devices of the wearers can interact such as by both having rotatable pieces spin or move to create the same design. The devices may light up to the preferred color of each wearer while sharing the same orientation of rotatable pieces 802, 804.

The devices could also be used to indicate a mood by color or actuation of the devices. For example, spinning of rotatable pieces could indicate excitement as could brighter colors, while darker colors may indicate boredom or fatigue.

In another aspect, a wearable device could comprise eyeglasses having two CCDs to track eye movement and look away from the eye, a microprocessor, a transceiver, and a microphone. Using such device, art could be created based on eye movement of the wearer. Like above, movement of multiple users could be overlaid/combined to form a collective art piece.

These eyeglasses could be used to control other devices by eye movement (e.g., volume up by glancing up and volume down by glancing down).

Figures 14A, 14B:
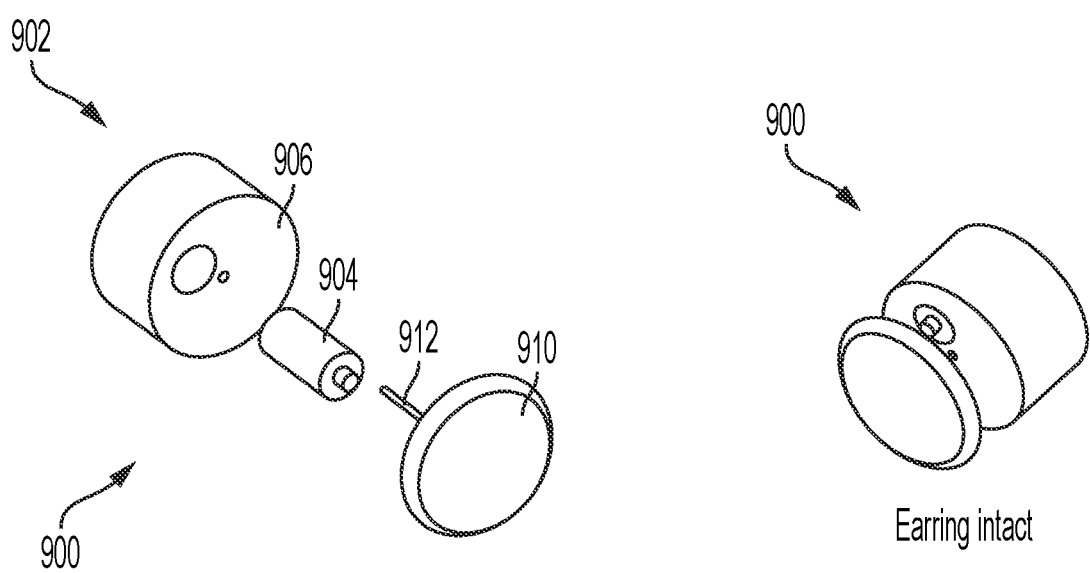
FIGS. 14A-14B illustrate another embodiment of a wearable device.

FIGS. 14A-14B illustrate another embodiment of a wearable device 900 in the shape of an earring. The device 900 can include a housing 902 in which a solenoid 904 and a power source 906 can be disposed. A decorative stud 910 and earring rod 912 can be coupled to the housing for connection to the user's ear.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system of wearables that communicate creating a unique system of operation based upon user preference, comprising:
   a first set of wearables configured to worn by a first wearer, wherein the first set of wearables are communicatively coupled to a first computing device, and wherein movement of the first wearer is tracked by the first set of wearables and communicated to the first computing device;
   a second set of wearables configured to worn by a second wearer, wherein the second set of wearables are communicatively coupled to the first computing device, and wherein movement of the second wearer is tracked by the second set of wearables and communicated to the first computing device;
   wherein each of the wearables of the first and second set comprises a solenoid and an accelerometer;
   wherein the first computing device receives information regarding each movement of the first wearer and generates or modifies a digital image based on the received movement of the first wearer; and
   wherein the first computing device receives information regarding each movement of the second wearer and generates or modifies the digital image based on the received movement of the second wearer.

2. The system of claim 1, wherein the communication is directed by an external source to create a group communication dynamic.

3. The system of claim 1, wherein the system is configured to find other wearables to connect with and to create a personal or group communication dynamic based on commonality of devices or preferences.

4. The system of claim 1, further comprising wherein the wearables of the first set interact based on interrogatories from one wearable to another.

5. The system of claim 4, wherein each of the wearables of the first set is configured to interrogate the wearables of the first set and other nearby wearables and receive information concerning a set of features of each of the wearables, and recommend to their wearers possible interactive dynamics for interaction among the wearables of different wearers.

6. The system of claim 1, further comprising a second computing device configured to be worn by the first wearer, wherein the second communicating device is configured to automatically interrogate, locate, and connect with the first set of wearables worn by the first user, and store an approximate location of each of the wearables on the first wearer.

* * * * *